(12) United States Patent
Paschal

(10) Patent No.: US 12,553,947 B2
(45) Date of Patent: Feb. 17, 2026

(54) CLOCK GLITCH DETECTOR

(71) Applicant: International Business Machines Corporation, Armonk, NY (US)

(72) Inventor: Matthew James Paschal, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 18/654,962

(22) Filed: May 3, 2024

(65) Prior Publication Data

US 2025/0341572 A1    Nov. 6, 2025

(51) Int. Cl.
| | | |
|---|---|---|
| *G01R 31/3185* | (2006.01) | |
| *G11C 19/28* | (2006.01) | |
| *H03K 3/037* | (2006.01) | |
| *H03K 19/20* | (2006.01) | |
| *H03L 7/08* | (2006.01) | |

(52) U.S. Cl.
CPC ........ *G01R 31/318552* (2013.01); *G01R 31/318541* (2013.01); *G11C 19/28* (2013.01); *H03K 3/037* (2013.01); *H03K 19/20* (2013.01); *H03L 7/08* (2013.01)

(58) Field of Classification Search
CPC .... G01R 31/318552; G01R 31/318541; G11C 19/28; H03K 3/037; H03K 19/20; H03L 7/08
USPC ................................................ 714/731, 744
See application file for complete search history.

(56) References Cited

U.S. PATENT DOCUMENTS

| | | | | |
|---|---|---|---|---|
| 6,973,072 | B1 * | 12/2005 | Muntz | H04L 45/60 |
| | | | | 370/351 |
| 8,552,764 | B2 | 10/2013 | Rohleder et al. | |
| 10,277,213 | B1 * | 4/2019 | Kimelman | H03K 19/21 |
| 10,884,448 | B1 * | 1/2021 | Lan | G06F 21/725 |
| 11,656,277 | B2 * | 5/2023 | Rajpathak | H03K 19/20 |
| | | | | 714/731 |
| 11,775,002 | B2 | 10/2023 | Paschal et al. | |
| 2011/0219208 | A1 * | 9/2011 | Asaad | G06F 9/06 |
| | | | | 712/12 |
| 2011/0317802 | A1 | 12/2011 | Rohleder et al. | |
| 2013/0113572 | A1 * | 5/2013 | Sharda | H03K 5/135 |
| | | | | 331/34 |
| 2022/0199191 | A1 * | 6/2022 | Nguyen | G11C 29/50 |
| 2022/0309191 | A1 * | 9/2022 | Brunn | G06F 21/725 |

(Continued)

FOREIGN PATENT DOCUMENTS

| | | |
|---|---|---|
| KR | 2016-0028048 A | 3/2016 |
| KR | 101610500 B1 | 4/2016 |

OTHER PUBLICATIONS

Chan, A., Circuits for Time and Frequency Domain Characterization of Jitter, B. Eng. 1999.

*Primary Examiner* — John J Tabone, Jr.
(74) *Attorney, Agent, or Firm* — Patterson + Sheridan, LLP

(57) ABSTRACT

Embodiments herein describe a glitch detector circuit (and method of operation) for detecting glitches in a clock signal. In one embodiment, the glitch detector includes a shift register that samples the reference clock using a clock signal output by a PLL. The value in a first memory element of the shift register can be sampled to previous values that were stored (and then bit shifted) in the shift register. If there is a mismatch, the glitch detector indicates there was a clock glitch in the reference clock, and a corrective action can be performed.

20 Claims, 5 Drawing Sheets

(56) References Cited

U.S. PATENT DOCUMENTS

2022/0413046 A1* 12/2022 Rajpathak ........ G01R 31/31727
2023/0035405 A1*  2/2023 Paschal ..................... G06F 1/08
2025/0112626 A1*  4/2025 Fayneh .................... H03K 5/14

* cited by examiner

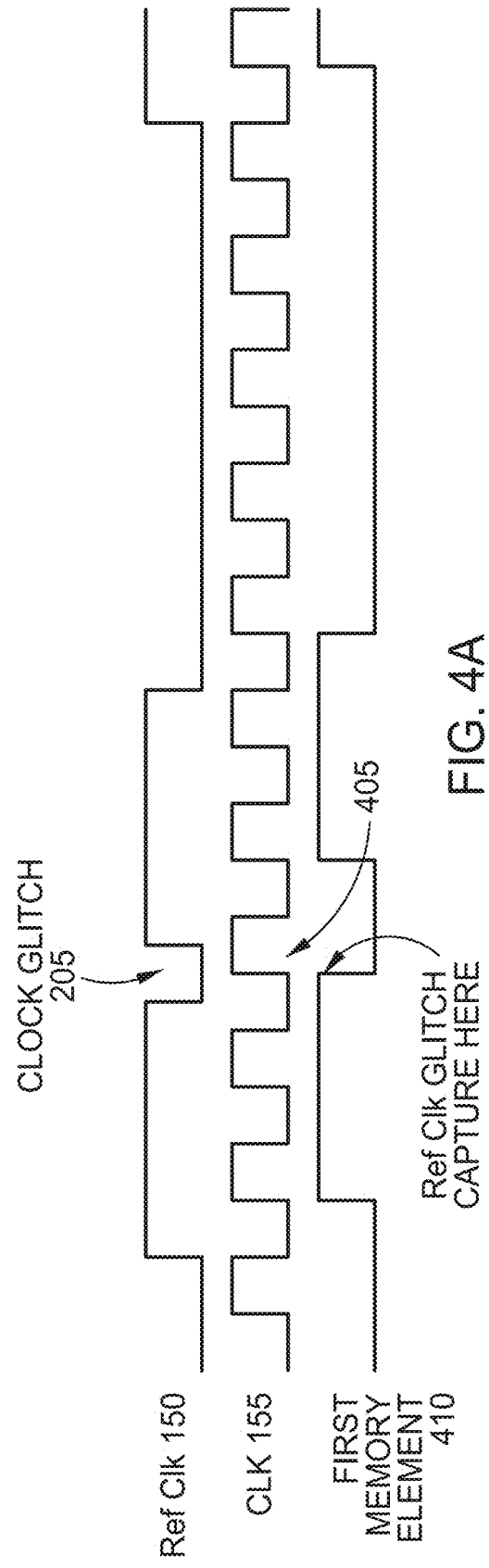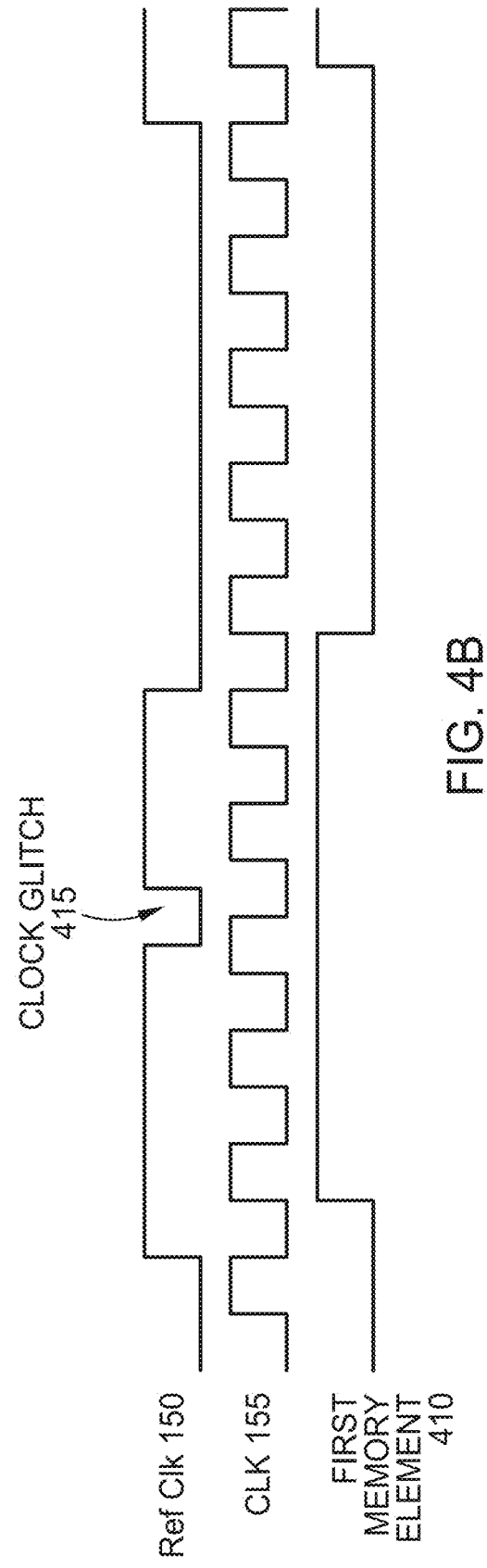

CLOCK GLITCH DETECTOR

BACKGROUND

The present invention relates to detecting clock glitches.

Clock glitches can cause timing errors in computer logic circuits. Clock edges that occur at an unexpected time can look like a frequency change to a phase locked loop (PLL) circuit or any other circuit that depends on exact timing of clock edges.

Clock glitches can be caused by any number of factors. One common cause is that radioactive nuclei emit alpha particles—including two protons, two neutrons, and high energy levels—which can interfere with transistors and cause a bit-flip. Cosmic rays, which contain alpha particles, can also interfere with computer chips in a similar fashion as radioactive particles.

SUMMARY

According to one embodiment of the present invention, a clock glitch detector circuit includes a phase locked loop (PLL) configured to generate a clock signal based on a reference clock, a shift register configured to store a current value of the reference clock based on the clock signal, a first set of latches configured to retrieve a plurality of shifted bits from the shift register, a second set of latches configured to compare a bit value stored at a first memory element of the shift register to outputs of the first set of latches, and OR logic coupled to the outputs of the second set of latches, wherein an output of the OR logic indicates whether there was a clock glitch.

According to one embodiment of the present invention, an integrated circuit (IC) includes a clock glitch detector that includes a shift register configured to store a current value of a reference clock based on the clock signal, a first set of latches configured to retrieve a plurality of shifted bits from the shift register, a second set of latches configured to compare a bit value stored at a first memory element of the shift register to outputs of the first set of latches, and OR logic coupled to the outputs of the second set of latches where an output of the OR logic indicates whether there was a clock glitch. The IC also includes a phase-locked loop (PLL) configured to generate a clock signal based on a clock signal received from the clock glitch detector.

According to one embodiment of the present invention, a method includes storing a current value of a reference clock in a shift register based on a output clock generated by a PLL, retrieving a plurality of shifted bits from the shift register, comparing the plurality of shifted bits to a first bit in the shift register, and determining whether there is a clock glitch based on the comparison.

BRIEF DESCRIPTION OF THE DRAWINGS

FIGS. 4A and 4B illustrate clock signals with clock glitches, according to several embodiments.

DETAILED DESCRIPTION

Embodiments herein describe a glitch detector circuit (and method of operation) for detecting glitches in a clock signal. For example, the glitch detector can determine when a reference clock has inadvertently (due to radiation, cosmic rays, alpha particles, etc.) changed states (e.g., went from low to high or from high to low). This can be reported to other circuitry in an integrated circuit (IC) or to a different entity (e.g., host operating system), which can take a corrective action such as, e.g., a clock switch circuit can switch to a backup clock.

In one embodiment, the glitch detector includes a shift register that samples the reference clock using a clock signal output by a PLL. For example, the PLL may receive the reference clock (e.g., a 100 MHz reference clock) as input and then output a (faster) internal clock (e.g., 6.4 GHz). The value in the first bit of the shift register can be sampled by previous values that were stored (and bit shifted) in the shift register. If an unexpected value is sampled then the glitch detector indicates there was a clock glitch in the reference clock, and a corrective action can be performed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
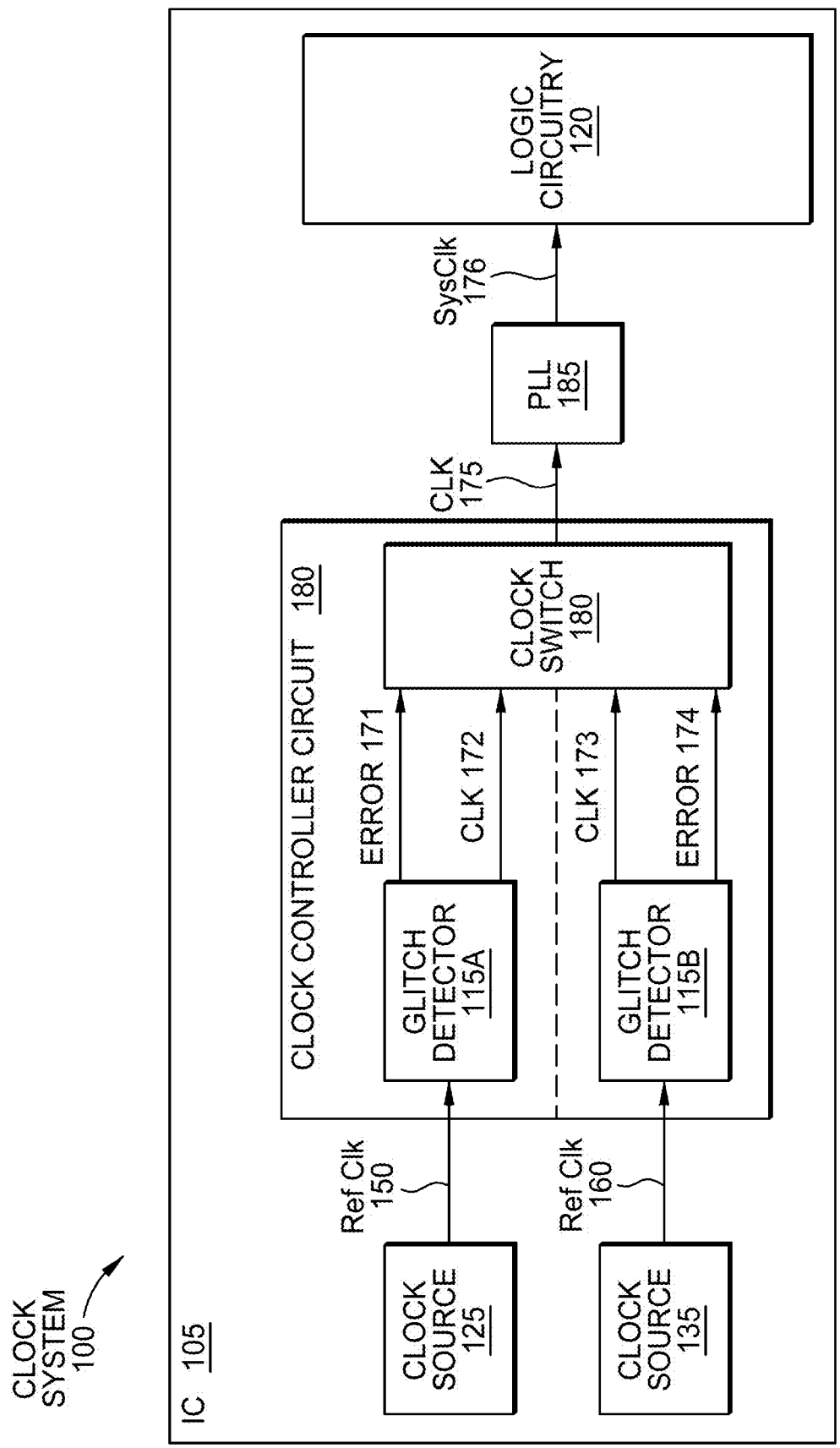
FIG. 1 illustrates a clock system with a glitch detector for detecting clock glitches, according to one embodiment.

FIG. 1 illustrates a clock system 100 with a glitch detector 115 (e.g., a clock glitch detector circuit) for detecting clock glitches, according to one embodiment. The clock system 100 illustrates an IC 105 that receives a reference clock (ref clk) 150 from a clock source 125 and a ref clk 160 from clock source 135. In this example, the clock sources 125 and 135 are internal to the IC 105, but in other embodiments the clock sources can be external from the IC 105 where the IC 105 uses an interface (e.g., an IO interface) to connect to the clock sources. The latter is often the case because a silicon IC 105 may not support other types of platforms that are suitable for fabricating high precision reference clock signals. As such, when a high precision ref clk 150/160 is desired for a silicon IC 105, a separate chip may be used to implement the clock sources. However, the embodiments herein are not specific to any particular location of the clock sources 125 and 135. In other embodiments, the clock sources 125 and 135 may be implemented using circuitry that is part of (integrated into) the IC 105.

In any case, the ref clk 150 is received at the glitch detector 115A while the ref clk 160 is received at glitch detector 115B in a clock controller circuit 180 in the IC 105. The details of the glitch detectors 115A and 115B are discussed below in FIGS. 3-5, but in general, the glitch detectors detect when there is a clock glitch in the ref clks which may be caused by alpha particles or any other means. For example, the clock glitch can be a period of time where the ref clks incorrectly transitions from high to low (when it should remain high) or from low to high (when it should remain low).

The glitch detector 115A outputs an error signal 171 and clk 172 while the glitch detector 115B outputs an error signal 174 and clk 173. The error signals 171, 174 can indicate whether the respective glitch detector 115 identified a glitch in the respective ref clk.

A clock switch 180 can select which of the clks 172, 173 to output as the clk 175. For example, if there is a glitch detected in one of clks 172, 173 (as indicated by one of the error signals 171, 174), the clock switch 180 switches to the other clk signal. Thus, at any given time, one of the clks 172 serves as the primary while the other serves as a backup.

A PLL 185 converts the clk 175 into a system clock (sysclk) 176. In one embodiment, the sysclk 176 has frequency that is a multiple (N) of the frequency of the clk 175. The clk 176 generated by the PLL 185 is provided to logic circuitry 120 in the IC 105. The logic circuitry 120 can be any circuitry in the IC 105 that operates according to the sysclk 176 generated by the PLL 185. For example, most, if not all, of the circuitry in the IC 105 may operate using the sysclk 176 (or some variant of the clock). The logic circuitry 120 can include sequential logic, memory elements, logic gates, buffers, and the like. The logic circuitry 120 can also include large circuit blocks such as processors, cores in a processor, random access memory, input/output (IO) circuitry, hardware accelerators, and the like.

While FIG. 1 illustrates one PLL 185, the IC 105 can include any number of PLLs that generate different internal clocks. For example, different logic blocks in the IC 105 may use different speed clocks. The PLLs could use the same ref clk 175 to generate different internal clocks for separate clock networks in the IC 105.

Figure 2:
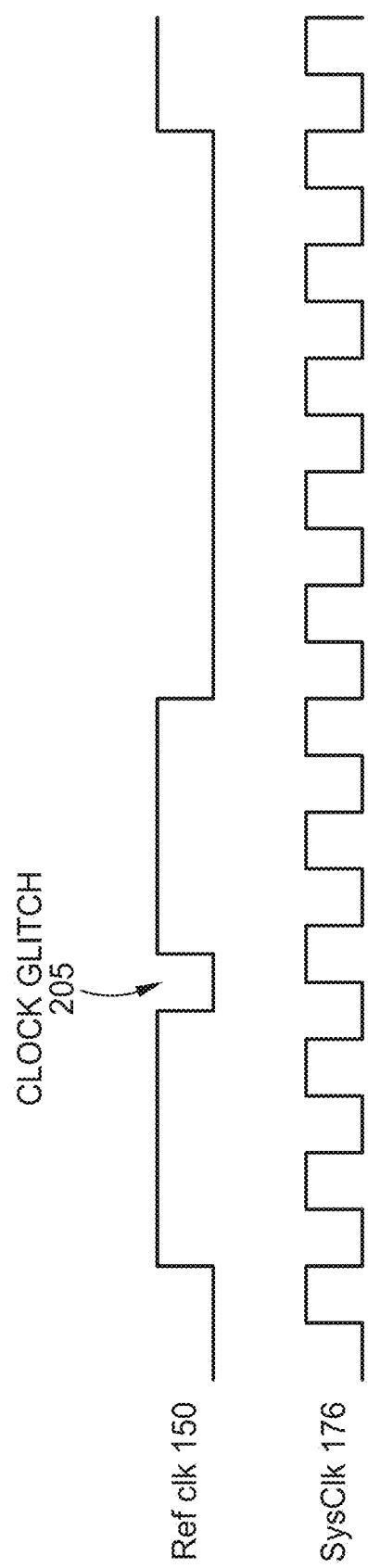
FIG. 2 illustrates clock signals, according to one embodiment.

FIG. 2 illustrates clock signals, according to one embodiment. In this example, FIG. 2 illustrates the ref clk 150 generated by the clock source 125 in FIG. 1 and the sysclk 176 generated by the PLL 185 in FIG. 1. As shown, the ref clk 150 has experienced a clock glitch 205 where the ref clk 150 has incorrectly moved from a high to a low state, when the ref clk 150 should have remained in the high state.

The clock glitch 205 can cause the PLL to mistakenly determine that the ref clk 150 has been sped up. For example, the PLL may lock to the rising edges of the ref clk 150. Without the clock glitch 205, there would be only two rising edges in the ref clk 150 in FIG. 2. However, the clock glitch 205 adds a third rising edge (the rising edge as the ref clk 150 returns to the correct high state). The PLL may attempt to lock onto the rising edge corresponding to the clock glitch 205 which can cause the clk 176 to increase frequency.

Increasing the frequency of the clk 176 can negatively impact the time of the logic circuitry (e.g., the logic circuitry 120 in the IC 105 of FIG. 1). For example, the clk 176 may arrive at the logic circuitry at a different time than the data signals. This can cause the logic circuitry to latch incorrect data. Or the increase in the clk 176 can cause downstream sequential logic to fail and miss its timing.

The circuitry and techniques described below enable an IC to detect the clock glitch 205 and notify other circuitry in the IC or a software application.

Figure 3:
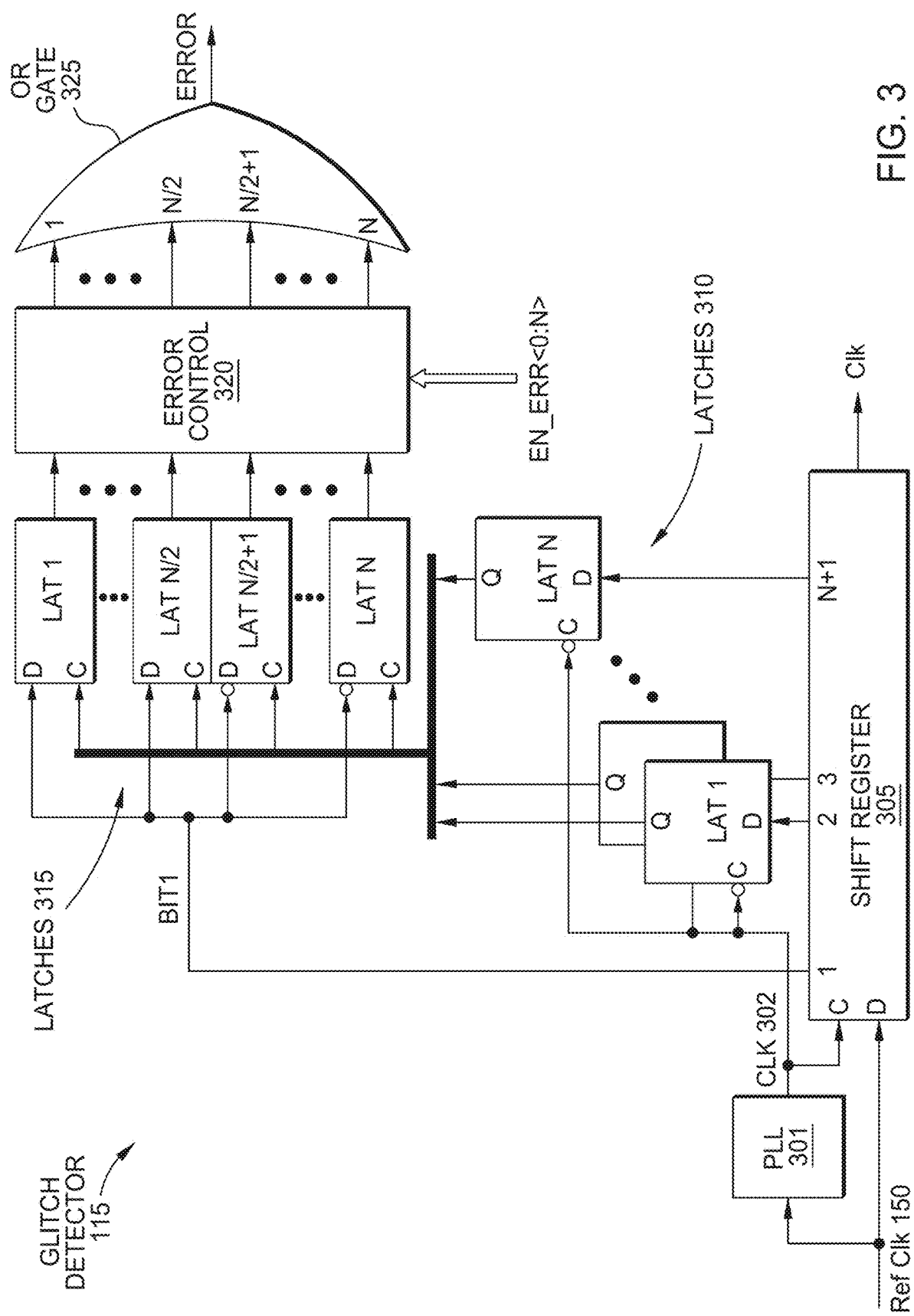
FIG. 3 illustrates circuitry for implementing a glitch detector, according to one embodiment.

FIG. 3 illustrates circuitry for implementing the glitch detector 115, according to one embodiment. FIG. 3 illustrates receiving the ref clk 150 (which can be received from an external clock source or an on-chip clock source). The glitch detector 115 includes a PLL 301 that receives the ref clk 150 (e.g., M Hz) and generates a clk 302 that has a frequency that is an N multiple of the ref clk 150 (e.g., M*N Hz). In one embodiment, N/2 is an integer value.

The glitch detector 115 includes a shift register 305 that receives the clk 302 and the ref clk 150 as inputs. In one embodiment, the clk 302 serves as a clock signal (C) for the shift register 305 while the ref clk 150 is a data input (D) of the shift register. Put differently, the shift register 305 samples the ref clk 150 using the clk 302. For example, at each rising edge of the clk 302, the register 305 may store in its first memory element the current value of the ref clk 150.

In one embodiment, the shift register 305 includes a cascade of memory elements (e.g., flip-flops or latches) where the output of one memory element is connected to the input of the next. In this case, the memory elements share a single clock signal (e.g., clk 302), which causes the data stored in the system to shift from one location to the next at each rising edge of the clk 302. The latch can include 1 through N+1 (or more) memory elements. The current value of the ref clk 150 is stored in the first memory element and then shifted according to the clk 302 until eventually reaching the N+1 memory element.

The shift register 305 includes N+1 memory elements but could have more memory elements such as N*2. Where the multiple N is a different number, the shift register 305 may be a different size (e.g., include a different number of cascade memory elements).

In addition to inputting the clk 302 to the shift register, the clk 302 is also used as a clocking signal for a first set of latches 310. In this embodiment, there are N number of latches 310 that are coupled to the 2 through N+1 memory elements of the shift register 305. Thus, in this example, the number of bits retrieved by the first set of latches 310 is equal to N (i.e., the frequency multiple that the PLL 301 applies to the ref clk 150 to generate the clk 302). Each cycle of the clk 302 causes the latches 310 to read in the current bits stored in 2 through N+1 memory elements of the shift register 305 (which is also bit shifted each cycle of the clk 302).

The output of the latches 310 are used as inputs (e.g., clocking inputs) to a second set of latches 315. In addition to receiving the output of the first set of latches 310, the second set of latches 315 receive the bit value stored at the first memory element of the shift register 305 (labeled BIT1). The second set of latches 315 includes N number of latches where for latches N/2+1 through N, the BIT1 is inverted. This is done because the N/2+1 through N latches 315 correspond to the up/high portion of the clock while the other 1 through N/2 latches correspond to the down/low portion of the clock.

The second set of latches 315 samples the bit in the first memory element of the shift register 305 with the N samples captured by the first set of latches 310. If there is a clock glitch at the current sample, at least one of the second set of latches 315 outputs a one. If there is not a clock glitch, each of the second set of latches 315 outputs a zero. If the clock glitch spans over multiple cycles of the clk 302, then multiple latches of the second set of latches 315 may output a one (and indicate an error) at the same time.

The outputs of the latches 315 are connected to error control logic 320. The error control logic 320 allows turning off any of the error latch outputs from the second set of latches 315 in case they mistakenly indicate a false error. This could be when one of the read out signal rising edges exactly aligns with the BIT1 signal rising edge. A control vector EN_ERR<0: N> enables/disables each signal from the latches 315 and then forwards these signals into an OR gate 325.

The OR gate 325 (or more generally, OR logic) receives the outputs of the second set of latches 315 via the error control logic 320. The OR gate 325 outputs an error if any one of the second set of latches 315 outputs a one. Otherwise, the OR gate 325 outputs a zero indicating no error is detected.

FIGS. 4A and 4B illustrate clock signals with clock glitches, according to several embodiments. As shown, FIG. 4A illustrates the same ref clk 150 and clk glitch 205 that was shown in FIG. 2. In addition to these clock signals, FIG. 4A illustrates the values stored in the first memory element of the shift register 305 in FIG. 3. That is, FIG. 4A illustrates using the clk 302 to sample and store the current value of the ref clk 150 into the first memory element 410 (BIT1 of FIG. 3) of the shift register 305.

Notably, the clock glitch 205 aligns with one of the rising edges of the clk 302, labeled as rising edge 405. Because the duration (or alignment) of the clock glitch 205 overlaps with at least one rising edge 405 of the clk 302, this means the clock glitch 205 is detected and stored in the first memory element 410 of the shift register.

However, FIG. 4B illustrates that depending on the duration (or alignment) of the clock glitch, it may not be detected in the first memory element 410. In FIG. 4B, a clock glitch 415 does not overlap with a rising edge of the clk 302. As such, the ref clk 150 would not be sampled at the time of the clock glitch 415. In that case, the first memory element 410 does not capture the clock glitch 415. Because the clock glitch 415 is not represented in the data in the shift register, this means that the glitch detector failed to detect an error. However, this may be because the clock glitch 415 does have a negative impact of the PLL. For example, the PLL may also sample the ref clk 150 at time periods that correspond to the rising edges of the clk 302. Since the clock glitch 415 does not overlap with one of the rising edges of the clk 302, this means the rising edge created by the clock glitch 415 did not have an impact on the PLL, as such, it can be ignored as a harmless clock glitch 415. In this manner, the glitch detector mimics the function of the PLL in that it may only detect clock glitches that have a deleterious effect on the PLL (e.g., the clock glitch 205 in FIG. 4A) but ignores clock glitches that do not affect the PLL (e.g., the clock glitch 415 in FIG. 4B).

Figure 5:
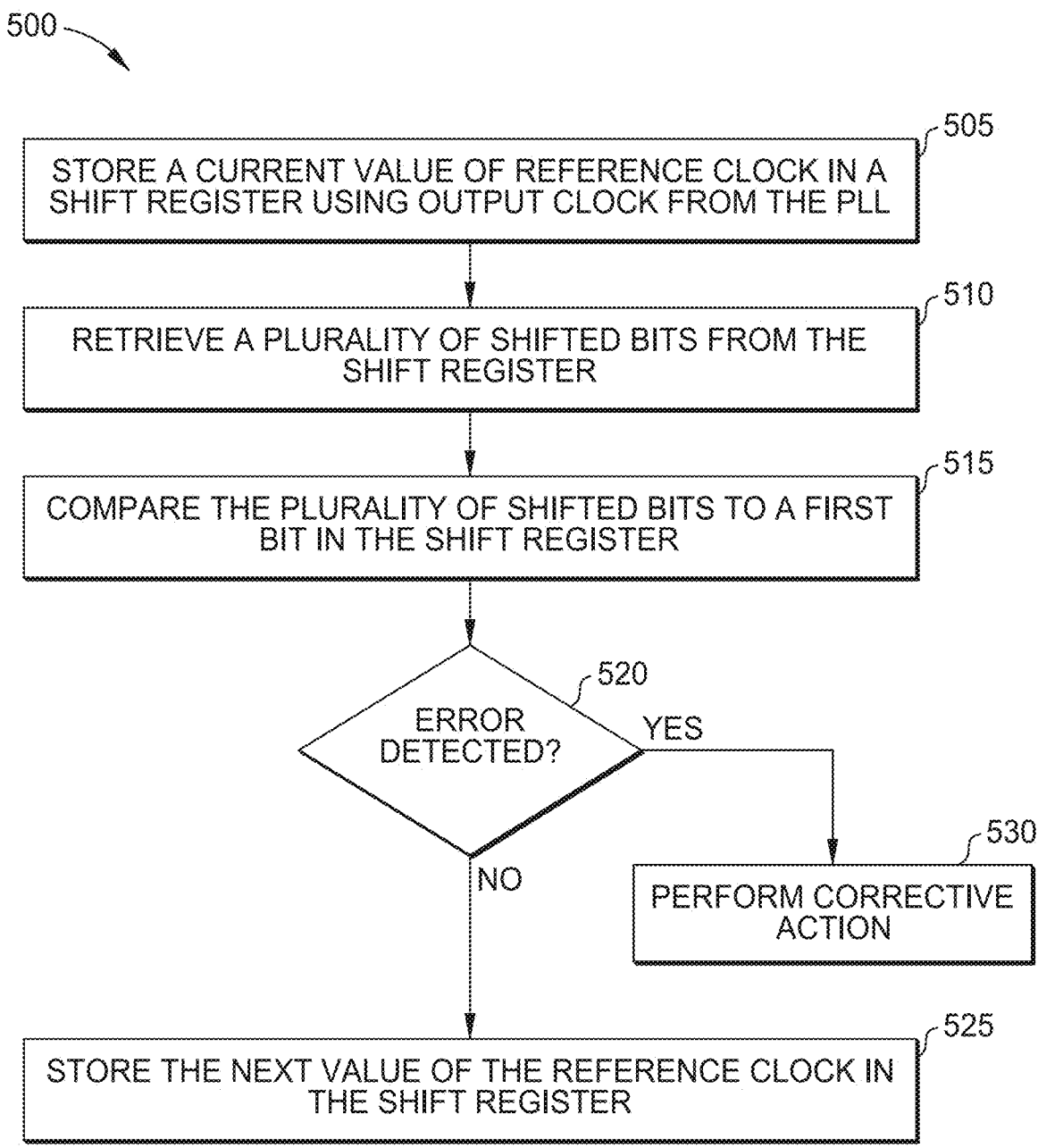
FIG. 5 is a flowchart for detecting clock glitches, according to one embodiment.

FIG. 5 is a flowchart of a method 500 for detecting clock glitches, according to one embodiment. At block 505, a shift register stores a current value of a reference clock using an output clock from a PLL. As discussed above, in one embodiment, the PLL generates the output clock using the reference clock. For example, the output clock of the PLL can have a frequency that is a multiple N of the frequency of the reference clock.

In one embodiment, the output clock generated by the PLL is used as a clocking input to the PLL in order to sample and store the current value of the reference clock. That is, the reference clock can be a data input to the shift register while the output clock is the clocking input to the shift register.

At block 510, a first set of latches (e.g., the latches 310 in FIG. 3) retrieves a plurality of shifted bits from the shift register. In FIG. 3, the first set of latches is coupled to memory elements 2 through N+1, again where N is the frequency multiple used by the PLL to increase the frequency of its output clock relative to the reference clock. In one example, the number of the first set of latches equals the frequency multiple N.

At block 515, a second set of latches (e.g., the latches 315 in FIG. 3) compare the plurality of shifted bits to a first bit in the shift register. In the example shown in FIG. 3, the outputs of the first set of latches 310 serve as clocking inputs to the second set of latches 315. The data input of the second set of latches is the value of the bit stored in the first memory element in the shift register. Moreover, this bit is inverted for half of the second set of latches, but not for the other half.

If any one of the second set of latches outputs a one, this may indicate there was a clock glitch. In this manner, comparing the bit value in the first memory element of the shift register to the N number of bit shifted values in the shift register can indicate there is a clock glitch.

At block 520, an output of an OR gate indicates whether an error is detected. Stated differently, the output of the OR can determine whether there is a clock glitch based on the comparison performed by the second set of latches.

If there was an error (e.g., any one of the second set of latches outputs a logical one), the method 500 proceeds to block 530 to perform a corrective action. In one embodiment, the IC may switch to a backup clock. For example, in FIG. 1, if one of the glitch detectors 115 identifies a clock glitch (and it is currently the clock used to generate the clk 175), the clock switch 180 can instead use the clk output of the other glitch detector to generate the clk 175.

In other embodiments, the corrective action can include resetting the system, powering off the chip, or informing an administrator.

If there was no error detected, the method 500 proceeds to block 525 where the process continues such that the shift register stores the next value of the reference clock (e.g., using the rising edge of the output clock generated by the PLL). The method 500 can then return to block 510, but this time, the values in the shift registers have been shifted another location. In this manner, the method 500 can check for a clock glitch during each cycle of the clock generated by the PLL.

While the foregoing is directed to embodiments of the present invention, other and further embodiments of the invention may be devised without departing from the basic scope thereof, and the scope thereof is determined by the claims that follow.

What is claimed is:

1. A clock glitch detector circuit comprising:
   a phase locked loop (PLL) configured to generate a clock signal based on a reference clock;
   a shift register configured to store a current value of the reference clock based on the clock signal;
   a first set of latches configured to retrieve a plurality of shifted bits from the shift register;
   a second set of latches configured to compare a bit value stored at a first memory element of the shift register to outputs of the first set of latches; and
   OR logic coupled to the outputs of the second set of latches, wherein an output of the OR logic indicates whether there was a clock glitch.

2. The clock glitch detector circuit of claim 1, wherein the clock signal serves as a clock for the first set of latches.

3. The clock glitch detector circuit of claim 1, wherein the outputs of the first set of latches serve as clock signals for the second set of latches.

4. The clock glitch detector circuit of claim 1, wherein half of the second set of latches invert the bit value stored at the first memory element at their inputs.

5. The clock glitch detector circuit of claim 1, wherein the clock signal has a frequency that is a multiple of a frequency of the reference clock.

6. The clock glitch detector circuit of claim 5, wherein a number of the plurality of shifted bits retrieved by the first set of latches is equal to the multiple.

7. An integrated circuit (IC), comprising:
a clock glitch detector comprising:
a shift register configured to store a current value of a reference clock based on a first clock signal,
a first set of latches configured to retrieve a plurality of shifted bits from the shift register,
a second set of latches configured to compare a bit value stored at a first memory element of the shift register to outputs of the first set of latches, and
OR logic coupled to the outputs of the second set of latches, wherein an output of the OR logic indicates whether there was a clock glitch; and
a phase-locked loop (PLL) configured to generate a second clock signal based on a third clock signal provided by the clock glitch detector.

8. The IC of claim 7, wherein the first clock signal serves as a clock for the first set of latches.

9. The IC of claim 7, wherein the outputs of the first set of latches serve as clock signals for the second set of latches.

10. The IC of claim 7, wherein half of the second set of latches invert the bit value stored at the first memory element at their inputs.

11. The IC of claim 7, wherein the first clock signal has a frequency that is a multiple of a frequency of the reference clock.

12. The IC of claim 11, wherein a number of the plurality of shifted bits retrieved by the first set of latches is equal to the multiple.

13. The IC of claim 7, further comprising:
an interface configured to couple the PLL to an external clock source, wherein the external clock source is configured to generate the reference clock.

14. The IC of claim 7, further comprising:
a clock source configured to generate the reference clock.

15. A method, comprising:
storing a current value of a reference clock in a shift register based on a output clock generated by a PLL;
retrieving a plurality of shifted bits from the shift register;
comparing the plurality of shifted bits to a first bit in the shift register; and
determining whether there is a clock glitch based on the comparison.

16. The method of claim 15, wherein determining whether there is the clock glitch is performed using OR logic.

17. The method of claim 15, the plurality of shifted bits retrieved from the shift register are stored in a first set of latches, wherein the first set of latches are clocked using the output clock.

18. The method of claim 17, wherein the comparison is performed using a second set of latches, wherein outputs of the first set of latches serve as clock signals for the second set of latches.

19. The method of claim 18, further comprising:
inverting the first bit of the shift register at half of the second set of latches.

20. The method of claim 17, wherein a number of the plurality of shifted bits retrieved by the first set of latches from the shift register is equal to a multiple by which the PLL increases the frequency of the reference clock when generating the output clock.

* * * * *